United States Patent
Rebsdorf et al.

(10) Patent No.: US 7,834,472 B2
(45) Date of Patent: Nov. 16, 2010

(54) METHOD OF CONTROLLING A WIND TURBINE CONNECTED TO AN ELECTRIC UTILITY GRID DURING MALFUNCTION IN SAID ELECTRIC UTILITY GRID, CONTROL SYSTEM, WIND TURBINE AND FAMILY HEREOF

(75) Inventors: Anders Varming Rebsdorf, Skanderborg (DK); Michael Houllind Jensen, Esbjerg V (DK)

(73) Assignee: Vestas Wind Systems A/S (DK)

( * ) Notice: Subject to any disclaimer, the term of this patent is extended or adjusted under 35 U.S.C. 154(b) by 693 days.

(21) Appl. No.: 10/567,913

(22) PCT Filed: Aug. 7, 2003

(86) PCT No.: PCT/DK03/00529

§ 371 (c)(1),
(2), (4) Date: Sep. 26, 2007

(87) PCT Pub. No.: WO2005/015012

PCT Pub. Date: Feb. 17, 2005

(65) Prior Publication Data

US 2008/0150282 A1 Jun. 26, 2008

(51) Int. Cl.
*H02P 9/00* (2006.01)
*F03D 7/00* (2006.01)
(52) U.S. Cl. ................... 290/44; 290/7; 322/37
(58) Field of Classification Search .......... 290/44, 290/43, 55; 322/37, 99
See application file for complete search history.

(56) References Cited

U.S. PATENT DOCUMENTS 5,907,192 A 5/1999 Lyons et al.
7,218,012 B1 * 5/2007 Edenfeld ................. 290/44
7,231,282 B2 * 6/2007 Schubert et al. ............. 700/287

(Continued)

FOREIGN PATENT DOCUMENTS

DE 3342583 6/1985

(Continued)

OTHER PUBLICATIONS

Siegfried Heier; "Windkraftanlagen Systemauslegung, Integration and Regelung" (textbook); Feb. 2003; Wobben Properties GmbH.

(Continued)

*Primary Examiner*—Nicholas Ponomarenko
(74) *Attorney, Agent, or Firm*—St. Onge Steward Johnston & Reens LLC

(57) ABSTRACT

The invention relates to a method of controlling a wind turbine connected to an electric utility grid during malfunction in said electric utility grid, said method comprising the steps of detecting a malfunction in said electric utility grid and monitoring at least one physical work property of at least one component of said wind turbine. Further, the method controls the pitch of one or more wind turbine blades of said wind turbine in order too keep said least one physical work property below at least one predefined limit in a time period of said malfunction. The invention also relates to a control system for a wind turbine connected and supplying electric power to a utility grid as well as a wind turbine and park hereof.

18 Claims, 13 Drawing Sheets

U.S. PATENT DOCUMENTS

| | | | |
|---|---|---|---|
| 7,322,794 B2 * | 1/2008 | LeMieux et al. | 416/40 |
| 7,345,373 B2 * | 3/2008 | Delmerico et al. | 290/44 |
| 7,417,333 B2 * | 8/2008 | Miller et al. | 290/44 |
| 7,476,985 B2 * | 1/2009 | Llorente Gonzalez | 290/44 |
| 7,650,786 B2 * | 1/2010 | Kabatzke | 73/510 |
| 2002/0000723 A1 | 1/2002 | Weitkamp | |
| 2003/0155773 A1 | 8/2003 | Wobben | |
| 2009/0039650 A1 * | 2/2009 | Nies | 290/44 |

FOREIGN PATENT DOCUMENTS

| | | |
|---|---|---|
| DE | 19532409 | 3/1997 |
| DE | 19534404 | 3/1997 |
| DE | 10105892 | 9/2002 |
| DE | 10115267 | 10/2002 |
| DK | WO 03/00529 | 7/2003 |
| GB | 2 330 256 | 4/1999 |
| GB | 2330256 | 4/1999 |

OTHER PUBLICATIONS

E-On Netz; "Erganzende Netzanschlussregeln fur windenergieanlagen" (article); 2002; Wobben Properties GmbH.

Werner Leonhard; "Regelung elektrischer Antriebe" (textbook); 2000; Wobben Properties GmbH.

Erich Hau; "Windkraftanlagen Grundlagen, Technik, Einsatz, Wirtschaftlichkeit" (textbook); 2003; Wobben Properties GmbH .

Vladislav Akhmatov; "The mutual effects of grid and wind turbine voltage stability control" (article); 2001; REpower Systems A/G.

* cited by examiner

METHOD OF CONTROLLING A WIND TURBINE CONNECTED TO AN ELECTRIC UTILITY GRID DURING MALFUNCTION IN SAID ELECTRIC UTILITY GRID, CONTROL SYSTEM, WIND TURBINE AND FAMILY HEREOF

FIELD OF THE INVENTION

The invention relates to a method of controlling a wind turbine connected to an electric utility grid during malfunction in said electric utility grid, a control system according to the preamble of claim 10, wind turbine to the preamble of claim 15 and a family of wind turbines.

BACKGROUND OF THE INVENTION

Typically, wind turbines are connected to an electric utility grid in order to be able to generate and supply electric power to consumers located remotely from the wind turbines. The power is sent through the transmission or distribution lines of the utility grid to homes, businesses and so on.

Wind turbines and other electric power generating means connected to a utility grid are protected from malfunctions in the utility grid by grid disconnection switches.

Malfunction in the utility grid may e.g. be

- transients or "spikes" which are very short-duration over-voltage and over-current power surges. The most dramatic transients are caused by strokes of lightning, but a majority are caused by large power loads switching on and off.
- sags or "brownouts" which are among the most commonly recorded power disturbances, and may occur as a momentary voltage drop.
- power interruptions, power outage, or "blackouts" which are the full loss of power in the utility grid.

The switches disconnect the wind turbines from the utility grid at the detection of the malfunction. The malfunction may be defined as grid variations above some specific limit e.g. voltage drops above +/−5% in relation to the nominal value of the grid voltage.

A problem with the grid disconnection of the wind turbines is the fact that the voltage variation may increase in size or duration by the loss of electric power production from the wind turbine generators. Further, the disconnected wind turbines require a period of time before they can be connected to the utility grid again. The disconnection of the wind turbines affects the production of power from the wind turbines and thus their profitability.

One of the objects of the invention is to establish a method and control system for controlling a wind turbine during malfunction in an electric utility grid without the above-mentioned disadvantage. It is especially an object of the invention to create a method and system which improve the strength and stability of the utility grid during malfunctions as well as the profitability of the connected wind turbines.

SUMMARY OF THE INVENTION

The invention relates to a method of controlling a wind turbine connected to an electric utility grid during malfunction in said electric utility grid, said method comprising the steps of detecting a malfunction in said electric utility grid, monitoring at least one physical work property of at least one component of said wind turbine, comparing said at least one physical work property with at least one predefined limit, and controlling one or more wind turbine blades of said wind turbine in order to keep said at least one physical work property below at least one predefined limit in a time period of said malfunction.

Hereby, a method for controlling a wind turbine during malfunction in an electric utility grid is established without the above-mentioned disadvantage. Especially, it is advantageous that the method allows the wind turbine to remain connected and supply power to the grid during the malfunction without damaging components in the wind turbine. The wind turbine will help stabilize the utility grid by remaining connected and generating power during the malfunction whereas an initial disconnection may increase or prolong the malfunction.

In an aspect of the invention, said detection for a grid malfunction is performed continuously or discontinuously e.g. every half second. Hereby, it is possible to ensure a high reliability in the detection as well as a high throughput and low response time from the start of the malfunction.

In another aspect of the invention, said monitoring of at least one physical work property includes monitoring of the temperature in the stator and/or rotor of the generator, the semiconductors of the electric control systems, the transformer and/or the gear means of the wind turbine. Hereby, it is possible to monitor the components of a wind turbine that normally is most likely to suffer high temperatures during a malfunction and thus face lifespan reductions if the property is not monitored and controlled.

In a further aspect of the invention, the grid malfunction is detected as grid voltage, current, frequency and/or temperature variations above a first predefined limit. Hereby, advantageous embodiments of the invention are achieved, especially as the limits may be compensated to fit different applications and surroundings. Further, the detected values may be combined in order to establish a clear indication of a grid malfunction.

In an even further aspect of the invention, said wind turbine is disconnected from the utility grid at temperatures or grid voltage, current, frequency variations above a second predefined limit. Hereby, it is assured that the wind turbine components are not damaged by severe or long lasting malfunctions in the utility grid. Further, it is ensured that the wind turbine is not kept grid connected if the connection is meaningless e.g. at total black-outs.

In an aspect of the invention, the pitch of said one or more wind turbine blades is controlled to keep said at least one physical work property below at least one predefined limit in a time period of said malfunction.

In an aspect of the invention, the pitch is controlled continuously during the malfunction or in one or more steps such as an instantaneous step at the start of the malfunction. Hereby, it may be assured that the power absorbed in the components and thus the internal temperature in the components may not go up to an unsound level e.g. harming the lifespan of the components.

In an aspect of the invention, the pitch of said one or more wind turbine blades is controlled in order to lower the generated power from the wind turbine generator during the malfunction e.g. from 100 to 30% of the nominal power generation. Hereby, it is possible to construct a simple control method in which the pitch is lowered to a predefined value at the start of the malfunction. With the lowering it is ensured that the wind turbine may be kept grid connected for a longer period in which the malfunction may disappear again. If the malfunction continues or the temperature starts to rise significantly, the wind turbine may either be disconnected or the pitch lowered further resulting in an even lower power generation.

In an aspect of the invention, the optimal pitch is resumed after the malfunction has been detected as terminated. Hereby, an advantageous embodiment of the invention is achieved, especially as the power generation is assumed quickly and thus ensuring the profitability of the wind turbine.

The invention also relates to a control system in which said system further comprises means for comparison of said at least one physical work property and at least one predefined limit, and means for controlling one or more wind turbine blades of said wind turbine in a time period of said malfunction where said one or more wind turbine blades are controlled in response to said comparison in order to keep said at least one physical work property below said at least one predefined limit.

Hereby, a control system for controlling a wind turbine during malfunction in an electric utility grid is established without the above-mentioned disadvantage.

The invention also relates to a wind turbine in which said wind turbine further comprises a control system for comparison of said at least one physical work property and at least one predefined limit, and means for controlling one or more wind turbine blades ( ) in a time period of said malfunction in order to keep said least one physical work property below said at least one predefined limit.

Hereby, an advantageous wind turbine is established which may stay connected to a utility grid during malfunction in the grid.

The invention also relates to a family of wind turbines such as one or more parks of wind turbines connected and supplying electric energy to a utility grid, said family comprising at least two wind turbines each with one or more controllable rotor blades, means for detecting a malfunction in said electric utility grid, means for monitoring at least one physical work property of at least one component of said at least two wind turbines, a central control system for comparison of said at least one physical work property and at least one predefined limit, means for controlling said one or more wind turbine blades of one or more of said at least two wind turbines in a time period of said malfunction in order to keep said at least one physical work property below said at least one predefined limit.

As power fluctuations from utility grid switching are a large problem with increased utility deregulation and less utility company cooperation, it is advantageous to be able to control parks of wind turbines centrally and especially ensure that the parks are not disconnected unnecessarily during malfunctions. Fewer changes during malfunctions also make it easier to control the stability of the utility grid from a central place.

BRIEF DESCRIPTION OF THE DRAWINGS

The invention will be described in the following with reference to the figures in which.

DETAILED DESCRIPTION OF THE INVENTION

Figure 1:
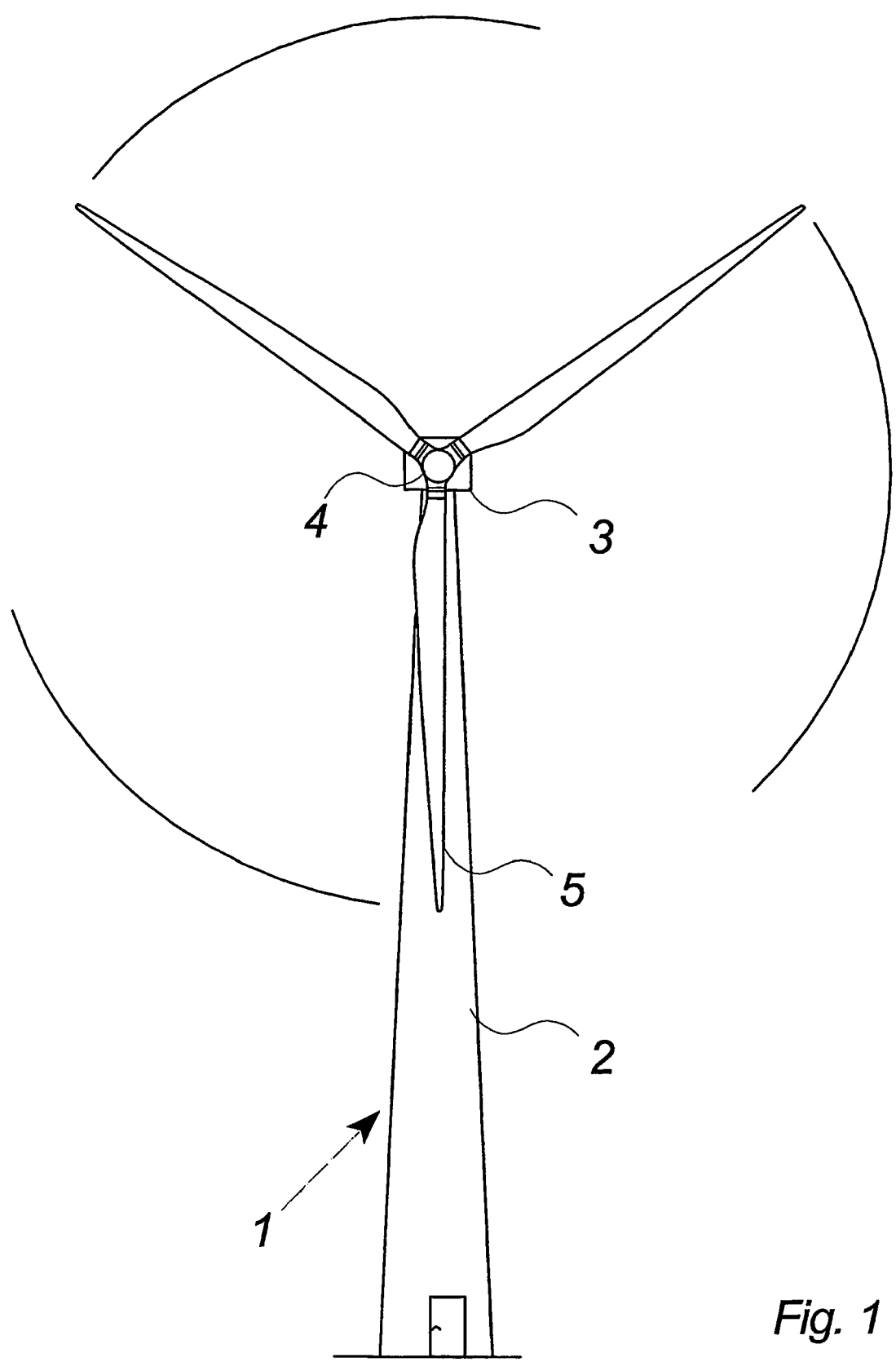
FIG. 1 illustrates a large modern wind turbine.

FIG. 1 illustrates a modern wind turbine 1 with a tower 2 and a wind turbine nacelle 3 positioned on top of the tower. The wind turbine rotor 5, comprising three wind turbine blades, is connected to the nacelle through the low speed shaft which extends out of the nacelle front.

As illustrated in the figure, wind beyond a certain level will activate the rotor due to the lift induced on the blades and allow it to rotate in a perpendicular direction to the wind. The rotation movement is converted to electric power, which is supplied to the utility grid.

Figure 2:
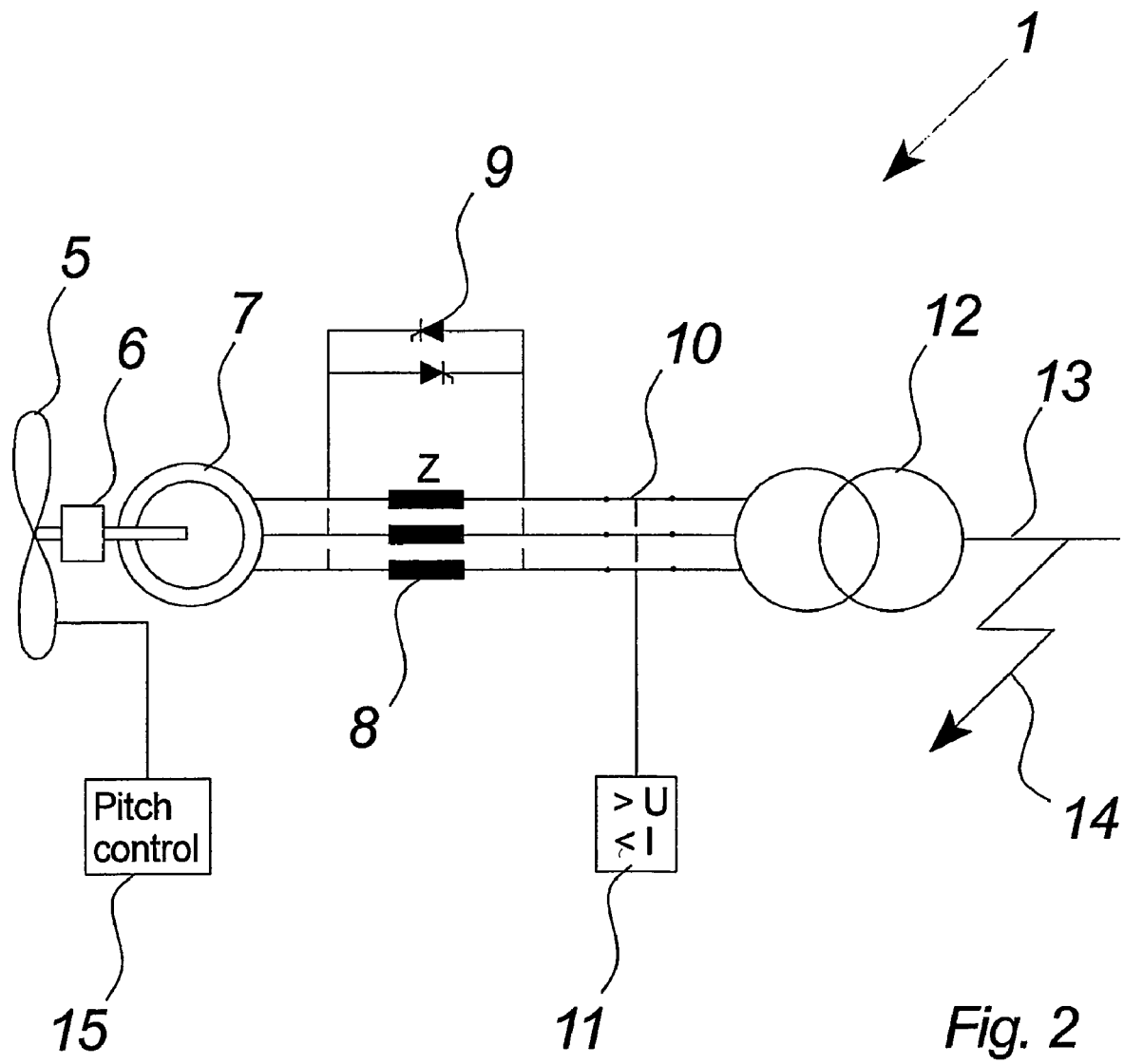
FIG. 2 illustrates the connection for a wind turbine to a utility grid.

FIG. 2 illustrates the connection for a wind turbine to a utility grid in order to supply electric energy to consumers.

The wind turbine 1 comprises the wind turbine rotor 5 in which the angle of each blade is controlled in order to achieve a preferred power production during normal use. The rotor is connected to the electric generator 7 through the low and high speed shaft separated by the gear means 6. The generated electric power is transferred to a three phase transformer 12 through three phases comprising impedances 8 with a value Z. The transformer 12 ensures that the generated voltage is stepped up to the grid voltage, such as from a generated voltage of few hundred volts AC to the thousands of volts AC of the utility grid 13.

The figure further illustrates that a malfunction 14 has occurred somewhere in the utility grid e.g. in form of a significant voltage drop. The malfunction results in a voltage drop at the wind turbine and thus also in a raising current from the wind turbine if the power generation is maintained. In order to protect the wind turbine from grid malfunctions, the turbine is usually disconnected from the utility grid by disconnection switches 10. The disconnection switches 10 are controlled by a detection system 11 which detects voltage or current changes in the utility grid at the wind turbine. In the event of a malfunction resulting in a voltage or current change above a limit, the three phases are opened by the switches and the wind turbine is thus disconnected from the utility grid.

At the grid disconnection of the wind turbine, the generated power may be short circuited through the three impedances 8 by switches 9 comprising two anti-parallel thyristors per phase. The power generation of the wind turbine is quickly terminated at the grid disconnection by pitching the blades out of the wind and stopping the wind turbine.

After the detection system 11 has detected that the situation of the utility grid is back to normal the wind turbine may be started again by releasing the mechanical brakes and pitching the blades into the wind again.

Figure 3:
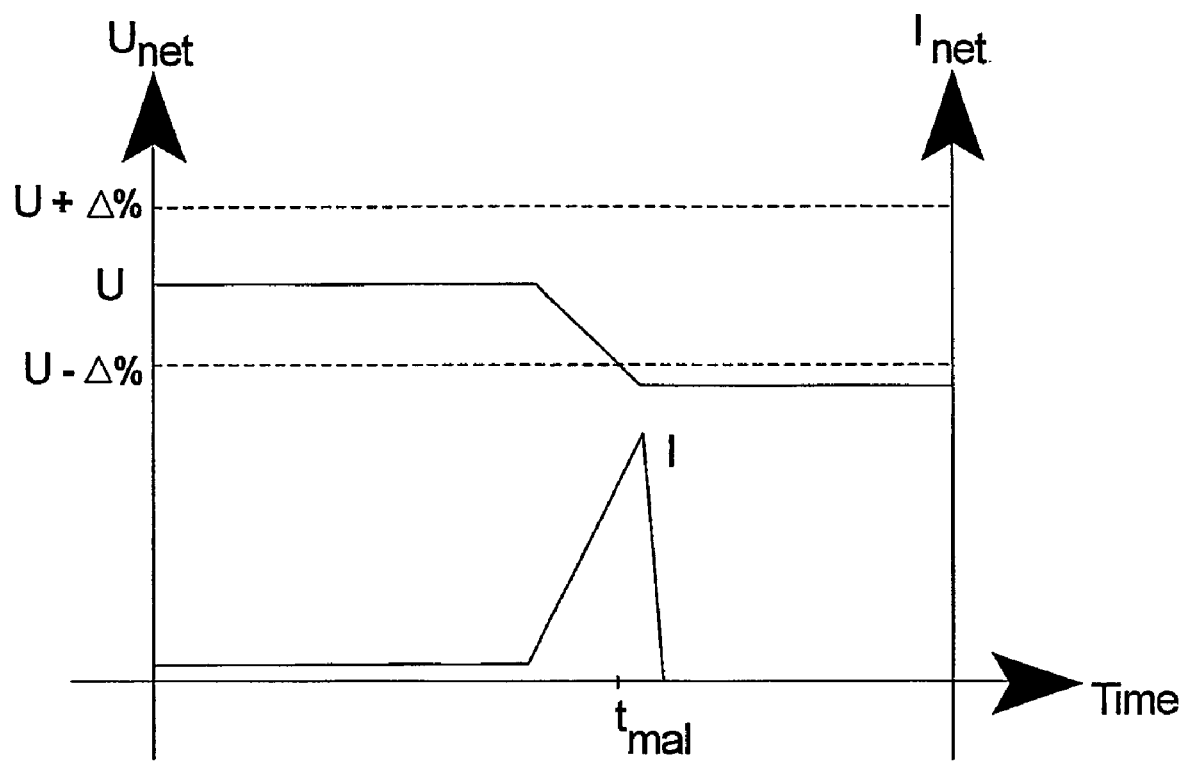
FIG. 3 illustrates an example of a voltage and current development at a wind turbine connected to a utility grid with a malfunction.

FIG. 3 illustrates an example of a voltage and current development at a wind turbine connected to a utility grid with a malfunction.

The grid voltage has a nominal voltage value of U but may under normal conditions vary (at or in proximity of the wind turbine) with a percentage value +/−Δ% of U without a disconnection of the wind turbine as consequence.

In the figure, it is illustrated how the value of the grid voltage suddenly starts to drop and at $t_{mal}$ the detection system 11 detects that the voltage has dropped below the limit corresponding to the value −Δ% of U.

During the voltage drop the current I delivered from the wind turbine is rising due to the fact that the wind turbine is generating the same amount of power P (=U*I=>I=P/U=> falling U at constant P results in raising I). The current I will be on the raise until the voltage drops below the limit and the wind turbine is disconnected. Hereafter, the current I will drop to nil after the wind turbine has been stopped and the last current is dumped in the impedances Z.

A malfunction may be shorter or longer in duration but is usually measured in few seconds. Further, the significance of a malfunction may vary e.g. from full grid blackout to smaller voltage drops or peaks.

Figure 4:
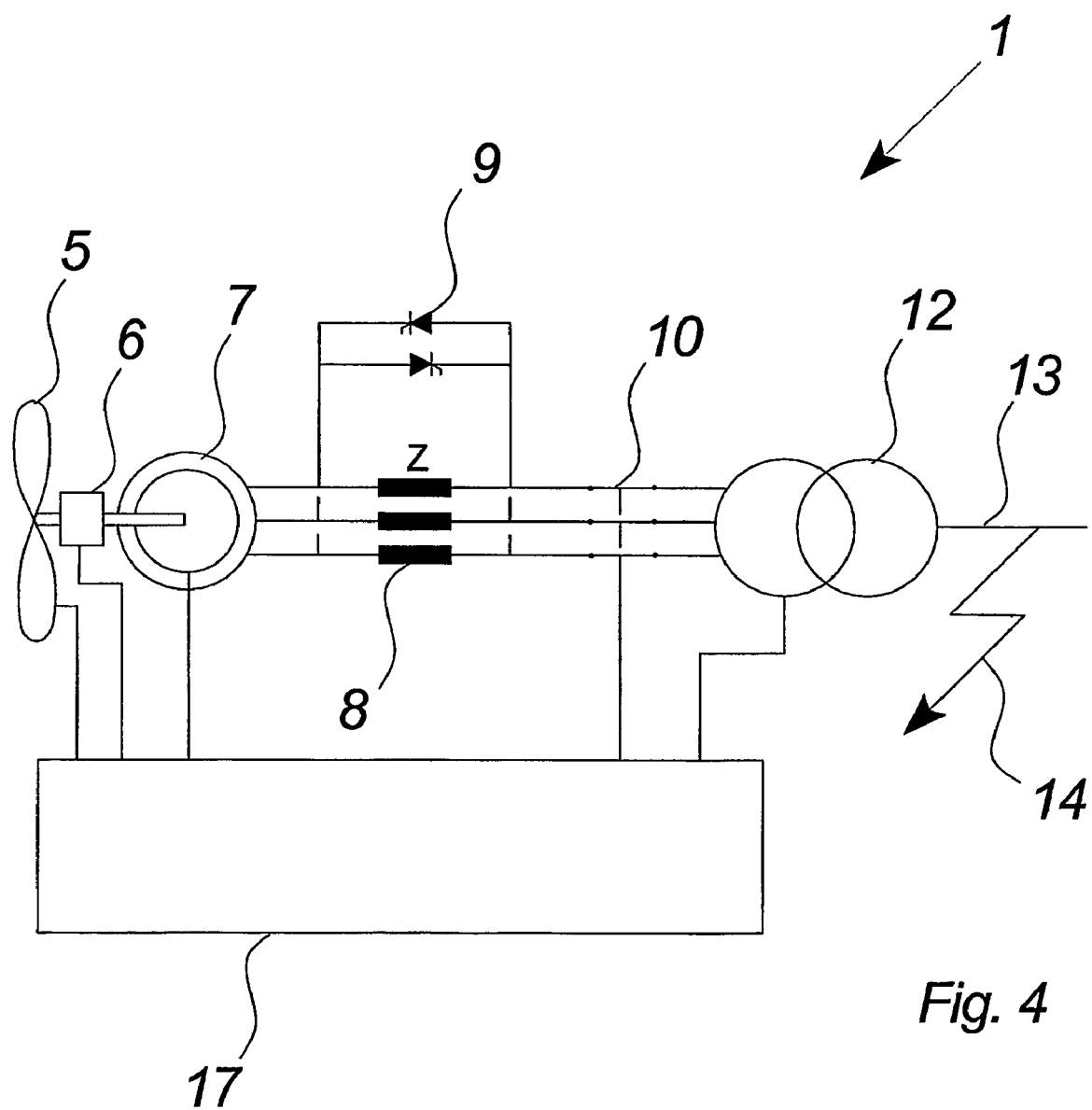
FIG. 4 illustrates a wind turbine with a control system in an embodiment according to the invention.

FIG. 4 illustrates a wind turbine 1 with a control system 16 in a preferred embodiment according to the invention.

The control system is connected to the different components of the wind turbine such as the wind turbine rotor and the pitch control of the rotor blades, the gear means, the generator, a frequency converter, the transformer and the disconnection switches. The control system detects one or more physical work properties of at least one component of the wind turbine in the malfunction period of the utility grid in order to avoid or delay the disconnection by controlling the wind turbine components such as the pitch angle of the rotor blades.

The control system allows the power generation of the wind turbine to be controlled in connection with a malfunction while the physical work properties of at least one component of the wind turbine are under surveillance. When the malfunction is detected the control system controls the level of power generation until the malfunction disappears or at least one of the physical work properties rises above a predefined limit. In the event of a physical work property crosses the limit, the wind turbine is disconnected from the utility grid and the wind turbine is stopped. The control system may be the normal control system for the wind turbine which comprises further functionalities and is used differently during malfunctions or a separate control system which takes over from the normal control system during malfunctions.

As the malfunction of the utility grid may initiate a higher current I from the wind turbine generator, it is especially important to detect the temperature of the components. The temperature will begin to go up due to the more power absorbed by the components ($P_{comp}=I_{mal}^2*R_{comp}$=>higher I=more power absorbed in the components). The temperature in one or more of the wind turbine components is an example of a physical work property. Further, the current or the grid voltage may be used as examples of a physical work property—alone or in connection with the temperature of the components.

The detection for a grid malfunction may be performed continuously or discontinuously e.g. every half second.

Further, the malfunction may be detected indirectly by measuring the temperature in one or more of the wind turbine components and assuming that a rising temperature above a limit is the result of a malfunction in the utility grid.

Figure 5:
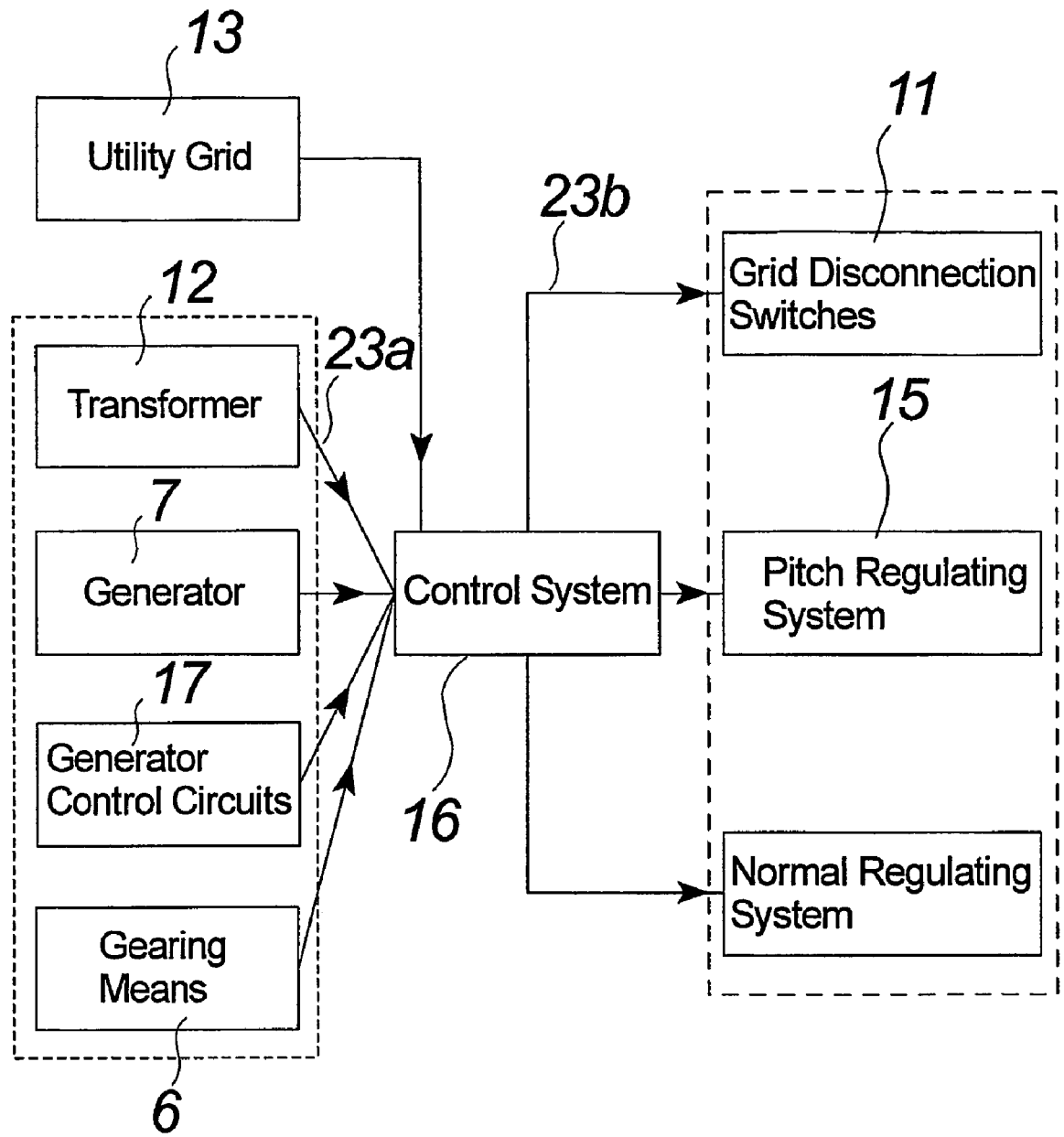
FIG. 5 illustrates schematically the different components of a wind turbine and a control system according to the invention.

FIG. 5 illustrates schematically the connection between the different components of the wind turbine 1 and a control system 16.

The section inside the smaller dotted line shows different components of the wind turbine that may be subject for detection of physical work properties during a malfunction. Some of the components are part of the electric generation system of the wind turbine such as the electric generator, the transformer and the generator control circuits. The generator control circuits may be one or more frequency converters adapting the frequency of the generated power to the grid frequency. The rest of the components are part of the mechanical system such as the gearing means.

The electric components all comprise electric resistance in which the power will be absorbed with a temperature rise as result. The electric components comprise different cooling means such as cooling ribs, ventilators and means for circulating water through the components as a cooling medium in order to control the temperature of the component.

The temperature may be measured in the components as a direct measurement in the component e.g. temperature sensors in critical places or as an indirect measurement e.g. in the cooling medium after having flown through the component. Other physical work properties may be measured with the necessary sensor e.g. voltage or current sensors.

The measured values for the physical work properties are transferred to the control system through connections 23a together with utility grid values such as supplied current and grid voltage. The control system may process the values in different ways in order to establish signals to control the power generation of the wind turbine during the malfunction. The process may simply involve comparison between the values and predefined limit values in which the limits indicate the crossing from safe operation to operation that may harm the lifespan of the component in question and thus indicating a disconnection of the wind turbine from the utility grid is appropriate.

The process may also involve a number of intermediate limits each indicating a lesser safe operation until the limit of harmful operation is reached. Each limit crossing may result in a control signal controlling the power generation of the wind turbine during the malfunction e.g. a successive reduction of the power generation while the temperature continues to rise in a component.

Further, the process may use different mathematical formulas e.g. in order to determine the rate of increase in a physical work property. If the rate becomes to steep the control system may respond to this even if no limit has been crossed.

Figure 6:
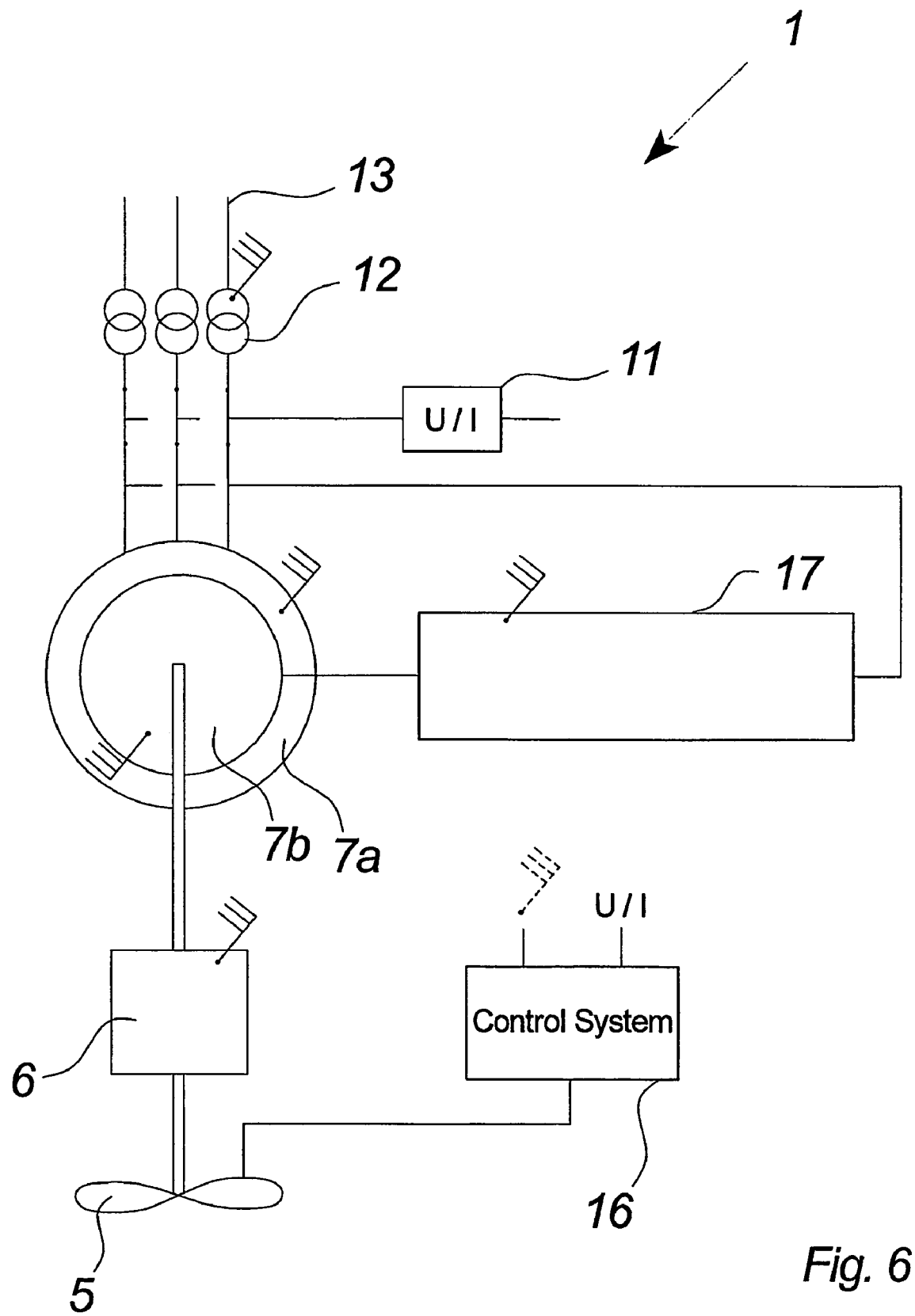
FIG. 6 illustrates the control system according to the invention in connection with a wind turbine comprising a double-fed electric generator.

FIG. 6 illustrates a preferred embodiment of the control system 16 in connection with a wind turbine comprising a double-fed electric asynchronous generator 7.

The generator comprises a stator 7a, connected to the utility grid through the three phased transformer 12. The rotor 7b of the generator is mechanically driven by the rotor 5 through the low speed shaft, the gearing means 6 and the high speed shaft. Further, the rotor is electrically connected to generator control circuits such as a frequency converter 17. The frequency converter includes a rectifier to rectify the AC voltage of the generator to a DC voltage, a DC link to smoothen the DC voltage and an inverter to change the DC voltage to an AC voltage again with a preferred frequency. The resulting AC voltage with the preferred frequency is transferred to the utility grid through the transformer.

The disconnection switches and the pitch of the rotor blades are controlled by the control system according to the invention on the basis of the measured voltage, current and/or temperature values 9. The figure illustrates how the temperature values may be measured in different components such as the rotor or stator of the electric generator, the transformer, the generator control circuits and the gearing means e.g. in the gearing oil.

FIGS. 7a to 7d illustrate examples of curves of temperature and power generation from a wind turbine at a changing pitch in connection with a malfunction of a utility grid.

Figure 7A:
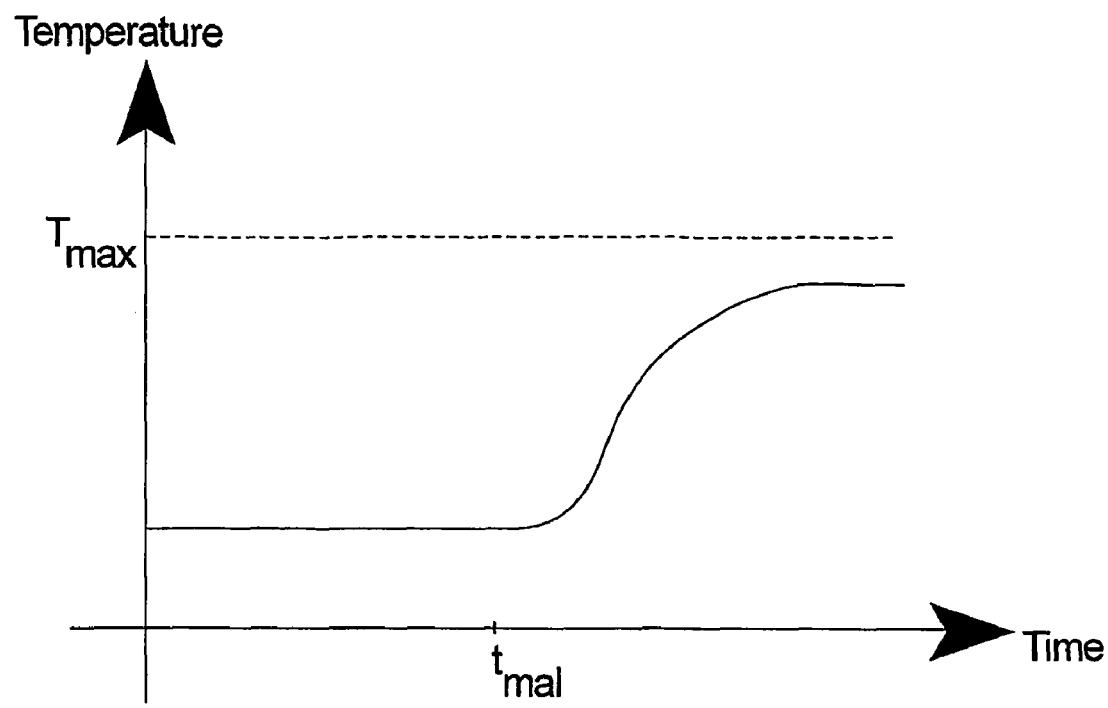
FIGS. 7a to 7d illustrate examples of temperature and power generation from a wind turbine at a changing pitch in connection with a malfunction of a utility grid.

FIG. 7a illustrates an example of the temperature development of a wind turbine component and the power generation during the connection to the utility grid at normal functionality as well as malfunction in the grid.

The temperature curve is illustrated as horizontal during normal functionality of the utility grid. However, at the time of malfunction the temperature starts to rise due to dropping grid voltage and rising current while the power generation by the generator of the wind turbine is kept constant.

Figure 7B:
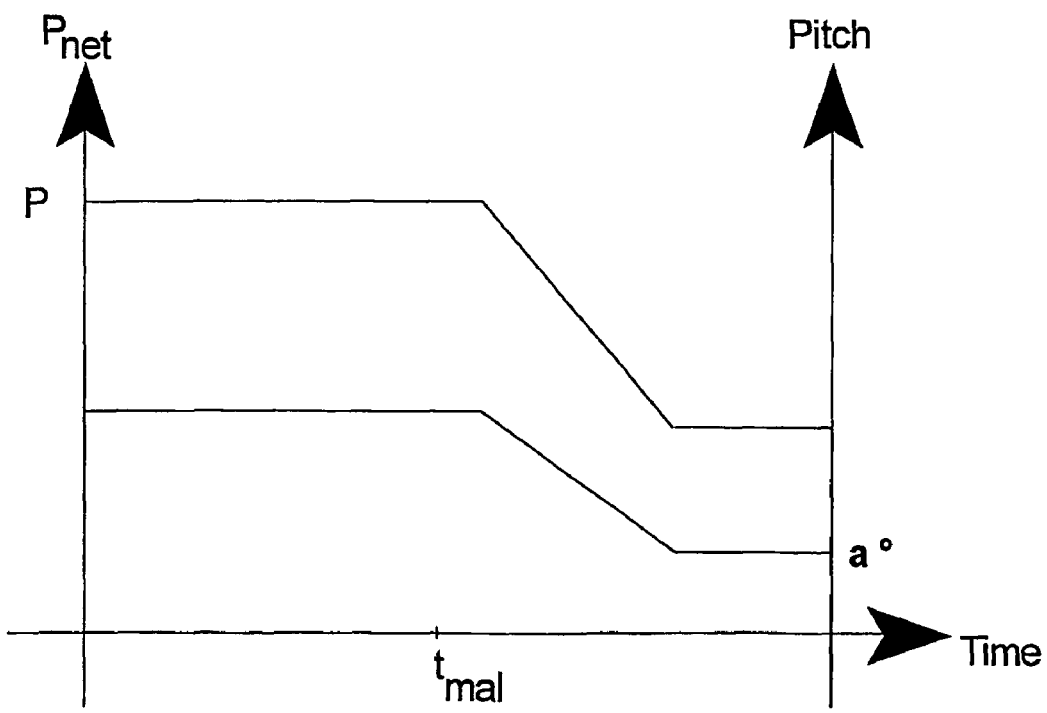

After the start of the malfunction the pitch angle of the rotor blades may be changed and thus lowering the power generation, as illustrated in FIG. 7b, in order to control the temperature rise. This is illustrated as the temperature curve stabilizing at a higher level but below a limit $T_{max}$ (indicating with a dotted line the highest acceptable temperature in the component).

FIG. 7b illustrates the curves of power generation and pitch angle α corresponding to the temperature development in the component as illustrated in FIG. 7a.

The pitch curve only illustrates the pitch being lowered once from an optimal value during normal power generation to a lower value in order to stabilize the temperature of a wind turbine component such as the temperature of the generator.

The pitch may be lowered instantaneously from the optimal value to a lower value e.g. from a value resulting in 100% generator production to 30% and subsequently disconnected if too high temperatures occur. Further, the pitch value may be lowered in smaller steps or continuously e.g. in response to detected temperature rising in a component until the temperature stabilizes or the value of the pitch reaches a lower limit in which the wind turbine is disconnected from the grid.

Figure 7C:
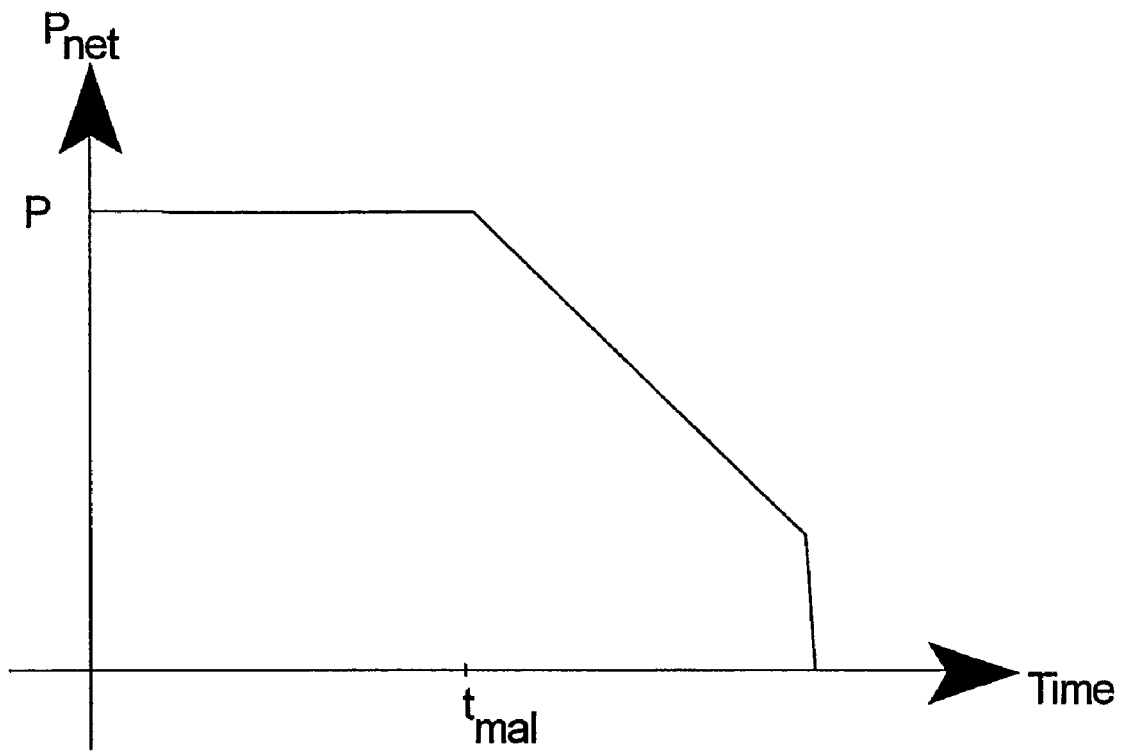

FIG. 7c illustrates the power curve as substantially horizontal during the normal situation but it should be understood that the production may change e.g. in connection with fluctuations in wind speed and grid demand.

At time $t_{mal}$ malfunction occurs in the utility grid e.g. a drop in the grid voltage beyond the predefined limits in the control system of the wind turbine. The control system detects the values of a physical work property and in response hereto starts to change the pitch angle of the rotor blades in order to reduce the power generation of the wind turbine (illustrated with the slightly declining curve). After a time period the values cross a limit and the control system disconnects the wind turbine from the grid. At the disconnection, the power generation of the wind turbine is stopped as indicated with the substantially vertical curve. The power generation is kept at hold until the malfunction is removed from the utility grid and the wind turbine may be connected to the utility grid once more.

Figure 7D:
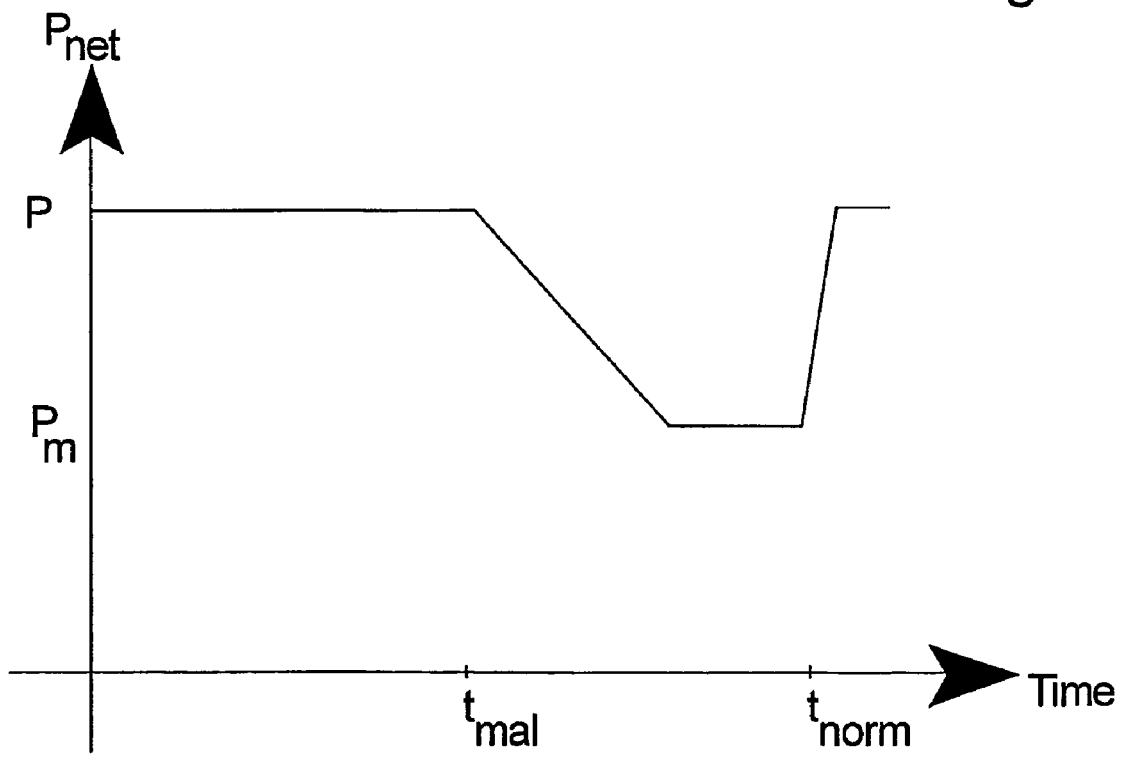

FIG. 7d illustrates another example in which the power generation is maintained during the malfunction at a lower level in which the values are detected and compared with the limit. After the removal of the malfunction the power generation is once more re-established at its full level.

The different temperature values may be logged in memory means of the control system such as a temperature value logged every 5 or every 30 minutes. The values can subsequently be used in determining the lifetime effect on the wind turbine component by the temperature rise.

Figure 8:
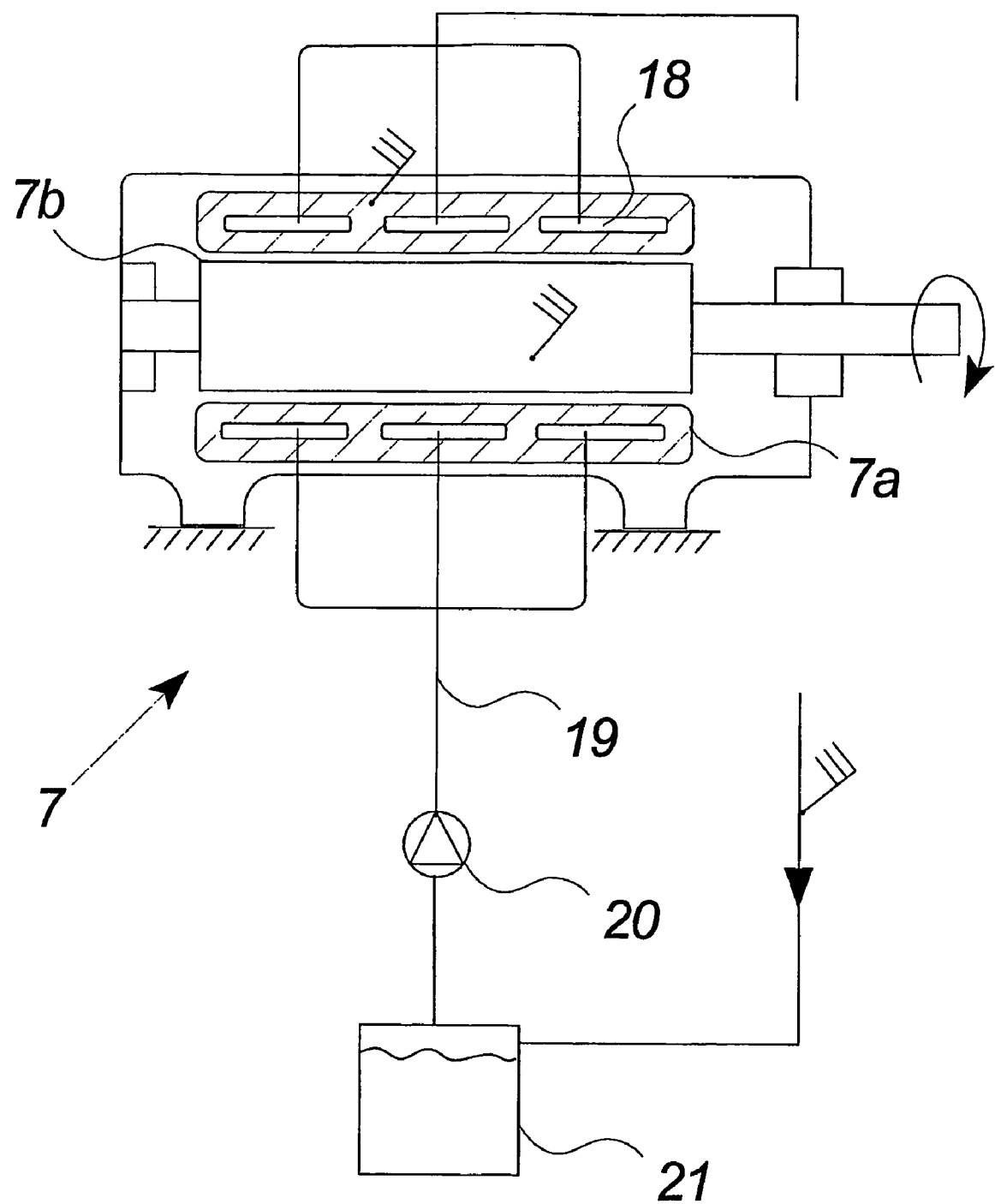
FIG. 8 illustrates a more detailed example of temperature measurement and control in an electric generator.

FIG. 8 illustrates a more detailed example of temperature measurement in an electric generator.

The asynchronous generator comprises at least a hollow stator in which cooling medium is flowing. The cooling medium is transferred from a container 21 with pumping means 20 through pipes to an inlet of the hollow stator 19. In the hollow stator the medium is circulated in cavities of the stator in order to cool the internal surfaces of the stator and indirectly the rotor surrounded by the stator. The heated medium is subsequently let out of the stator to exterior cooling means before reentering the stator again.

Temperature measurements may be obtained by placing sensors in the cooling medium as the medium leaving the stator gives an indirect indication of the temperature in the stator as well as the rotor. Further, standard temperature sensors positioned inside the stator and rotor may obtain the necessary temperature measurements. Even further, the temperature measurements may be obtained by other temperature measuring methods such as detecting the infrared radiation from different location of the generator.

Figure 9:
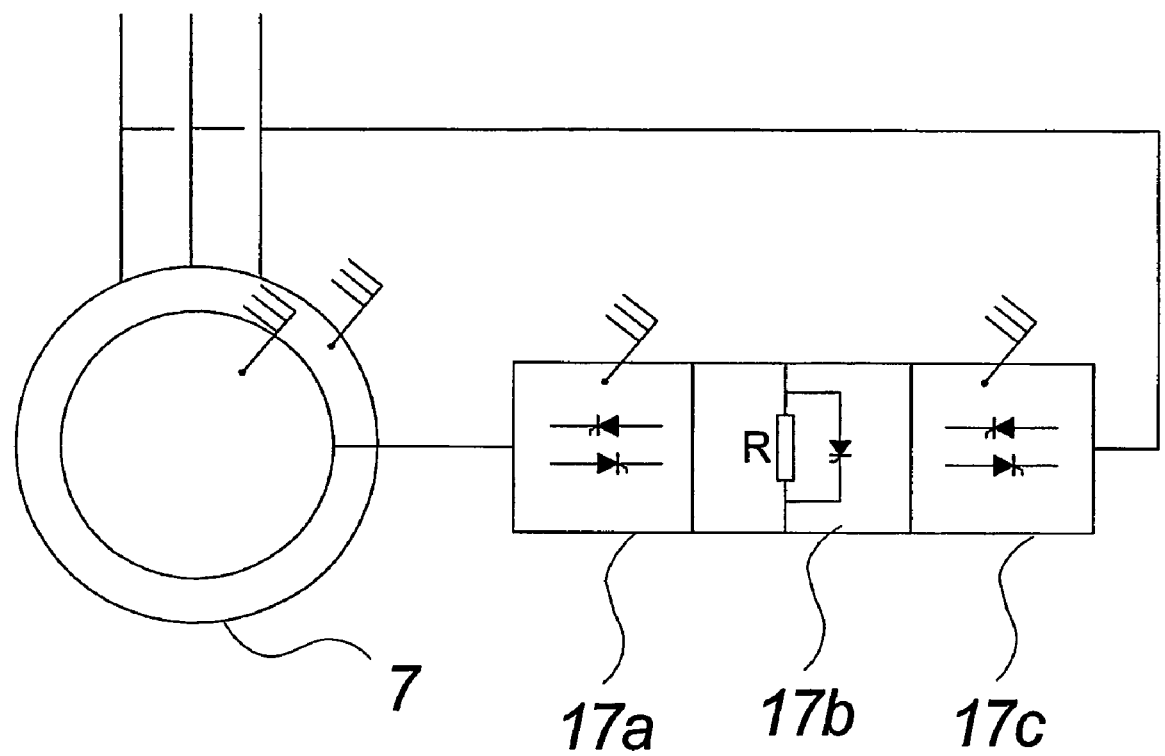
FIG. 9 illustrates a more detailed example of temperature measurement in a frequency converter.

FIG. 9 illustrates a more detailed example of temperature measurement in a frequency converter.

As explained above the frequency converter 17 comprises a rectifier 17a, a DC link 17b and an inverter 17c in which the rectifier and the inverter are established with thyristors or similar semiconductor switches. The thyristors of the rectifier and especially the inverter are controlled in well-known ways in order to establish the preferred AC voltage and frequency to the utility grid.

A resistor in the DC link may be used as dump load for any power generated after the disconnection of the wind turbine. The resistor as well as the thyristors are preferably air or water-cooled. By measuring the temperature positioned on the thyristors with temperature sensors, it is possible to establish an indication of the temperature in the semiconductor material of the thyristors. Further, it is also possible to measure the temperature indirectly by placing sensors in the air or water flow from the thyristors.

The figure also illustrates the asynchronous double fed generator with temperature measurements in rotor and stator.

The temperature measurements are preferably compensated in the control system for consequences of any very high or low ambient temperature.

Figure 10A:
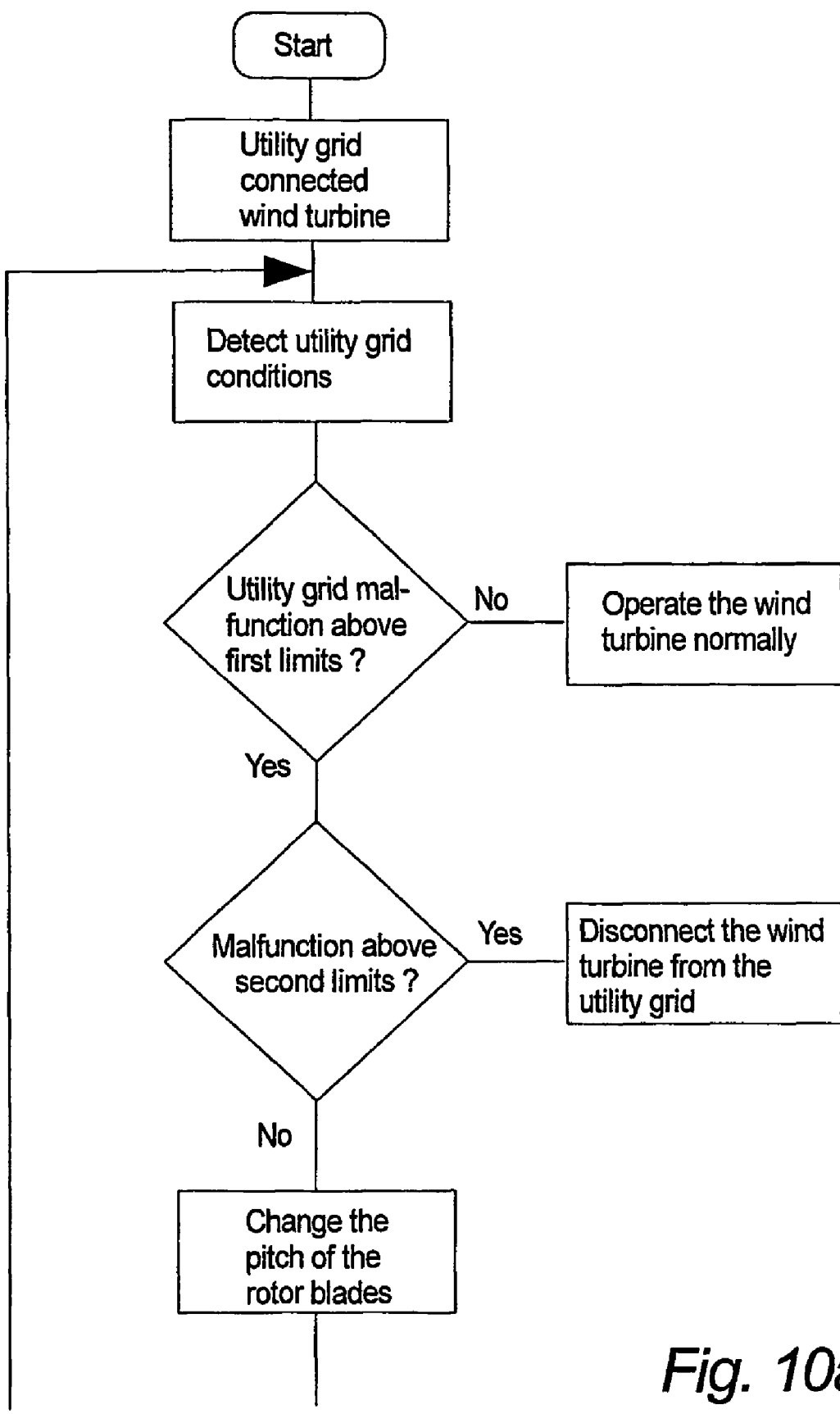
FIGS. 10a and 10b illustrate a method according to the invention of controlling a wind turbine connected to an electric utility grid during malfunction in the grid.
Figure 10B:
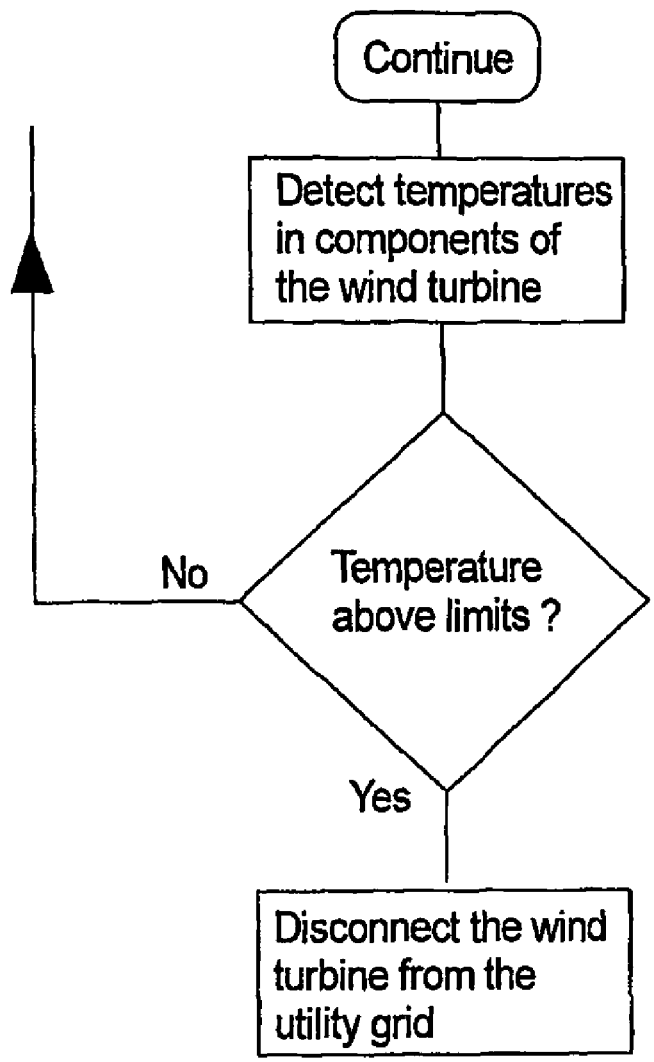

FIGS. 10a and 10b illustrate a method according to the invention of controlling a wind turbine connected to an electric utility grid during a malfunction in the grid.

The method comprises the steps of:
Connecting a wind turbine to the utility grid and controlling the power generation with a control system.
Detecting the grid conditions with the control system such as the grid voltage at the wind turbine connection.
Comparing the values with a first predefined limit in order to determine the malfunction e.g. a voltage drop above +/−5 percent. If the values are below the limit, the wind turbine is operated normally.
Comparing the detected malfunction values with the second predefined limits in order to determine the significance of the malfunction e.g. a full blackout of the grid requesting an immediate disconnection of the wind turbine from the grid.

Detecting different temperatures of the components in the wind turbine.

Lowering the power production of the wind turbine by changing the pitch of the rotor blades as a result of said temperature measurements.

Comparing the temperature with predefined limits for the temperature in the components. The power generation is maintained at the lower level during the malfunction until the temperature rises too much in which the pitch is once more changed in order to lower the power generation further. The wind turbine may be disconnected from the grid by the control system if the temperature detecting indicates that the temperature development is close to a harmful level.

Figure 11:
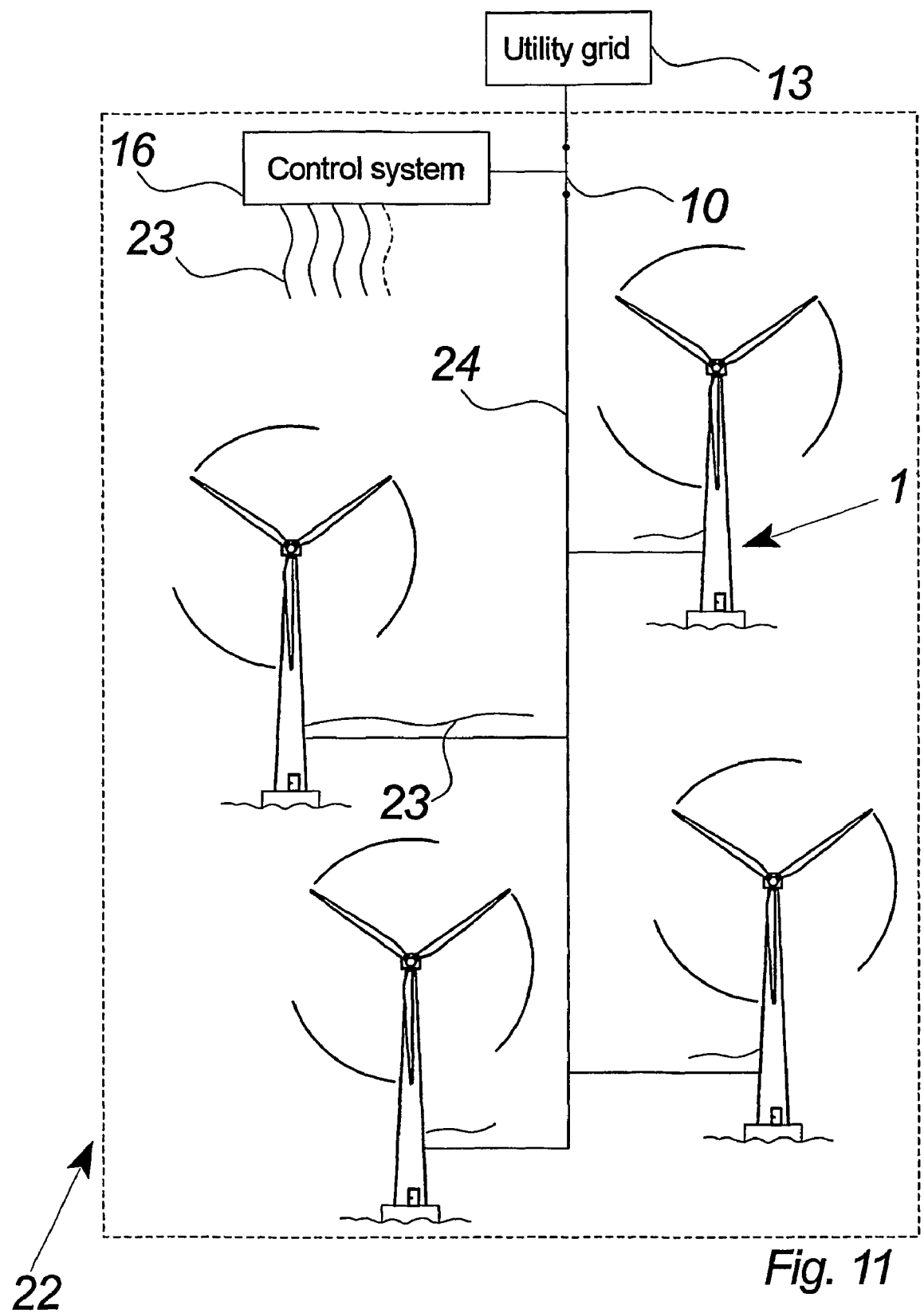
FIG. 11 illustrates a family of wind turbines connected to a utility grid.

FIG. 11 illustrates a family of wind turbines, which may be an offshore or onshore park of wind turbines with a common connection 24 to the utility grid 13. The connection includes switches 10 for connecting or disconnecting the park from the grid in which the switches is controlled by a central control system 16 during a malfunction in the grid. The control system is supplied with detected values of physical work properties in different components in each of the wind turbines e.g. the temperature of the components and the current supplied from the wind turbine. The values are used in controlling the power generation from the wind turbines by changing the pitch angle of the rotor blades in the relevant wind turbines and/or by disconnecting one or more of the wind turbines in the park. By using a central control system in detecting relevant values of physical work properties and changing the power generation from the wind turbines of the park it is possible to maintain the park connected to the utility grid in a malfunction situation.

The invention has been exemplified above with reference to specific examples. However, it should be understood that the invention is not limited to the particular examples described above but may be used in connection with a wide variety of applications such as different wind turbine types in which the rotor blades may be controlled e.g. types involving pitch or active stall. Further, it should be understood that especially the control system according to the invention may be designed in a multitude of varieties within the scope of the invention as specified in the claims. Especially, the detected physical work properties may be measured in any preferred location of the component by any possible measuring method and means.

LIST

1. Wind turbine
2. Wind turbine tower
3. Wind turbine nacelle
4. Wind turbine hub
5. Wind turbine rotor blades
6. Gearing means
7, 7a, 7b. Electric generator, stator, rotor
8. Impedance between the generator and transformer
9. Thyristor switches for short-circuiting said impedances
10. Grid disconnecting switches
11. Detection system for the disconnecting switches
12. Electric transformer
13. Utility grid
14. Grid malfunction e.g. short circuit
15. Pitch control of said rotor blades
16. Control system for a wind turbine
17, 17a-17b. Frequency converter, rectifier, intermediate DC link, inverter
18. Cooling channels
19. Inlet of cooling means
20. Pump for cooling means
21. Container for cooling means
22. Family of wind turbines such as an offshore park of wind turbines
23, 23a. Detected signal connections
23b. Control signal connections
24. Main connection
P, U, I, Z. Power, voltage, current, impedance
α. Pitch angle
Δ. Delta value
t. Time
T. Temperature
※(=X). Temperature measurement in components of the wind turbine

The invention claimed is:

1. Method of controlling a wind turbine connected to an electric utility grid during malfunction in said electric utility grid, said method comprising:
detecting a malfunction in said electric utility grid via at least one detector;
monitoring temperature in at least one of a stator, a rotor of the generator, semiconductors of electric control systems, a transformer and gear means of the wind turbine via at least one sensor,
comparing said temperature with at least one predefined limit via a comparator, and
controlling at least one wind turbine blade of said wind turbine via at least one control mechanism in order to keep said temperature below at least one predefined limit in a time period of said malfunction.

2. Method of controlling a wind turbine according to claim 1, wherein said detection for a grid malfunction is performed continuously.

3. Method of controlling a wind turbine according to claim 1, wherein the grid malfunction is detected as at least one of grid voltage, current, frequency and temperature variations above a first predefined limit.

4. Method of controlling a wind turbine according to claim 3, wherein said wind turbine is disconnected from the utility grid at least one of temperature, grid voltage, current, and frequency variations above a second predefined limit.

5. Method of controlling a wind turbine according to claim 1, wherein a pitch of said at least one wind turbine blade is controlled to keep said temperature below at least one predefined limit in a time period of said malfunction.

6. Method of controlling a wind turbine according to claim 5, wherein the pitch is controlled continuously during the malfunction.

7. Method of controlling a wind turbine according to claim 5, wherein the pitch of said at least one wind turbine blade is controlled in order to lower the generated power from the wind turbine generator during the malfunction such as from 100% to 30% of the nominal power generation.

8. Method of controlling a wind turbine according to claim 5, wherein an optimal pitch is resumed after the malfunction has been detected as terminated.

9. Method of controlling a wind turbine according to claim 1, wherein said detection for a grid malfunction is performed discontinuously such as every half second.

10. Method of controlling a wind turbine according to claim 5, wherein the pitch is controlled in at least one step such as an instantaneous step at the start of the malfunction.

11. Control system for a wind turbine connected and supplying electric energy to a utility grid, said system comprising:

at least one detector for detecting a malfunction in said electric utility grid;

a least one sensor for monitoring temperature in at least one of a stator, and a rotor of the generator, semiconductors of electric control systems, a transformer and gears of the wind turbine;

a comparator for comparison of said temperature and at least one predefined limit; and at least one control mechanism for controlling one or more wind turbine blades of said wind turbine in a time period of said malfunction;

wherein said one or more wind turbine blades are controlled in response to said comparison in order to keep said temperature below said at least one predefined limit.

12. Control system for a wind turbine according to claim 11, wherein said at least one detector for detecting at least one of grid voltage, current, frequency and temperature variations.

13. Control system for a wind turbine according to claim 12, wherein said at least one detector comprises predefined minimum and maximum limits for at least one of the voltage, current frequency values and temperature for comparison purpose.

14. Control system for a wind turbine according to claim 11, wherein said at least one detector detects malfunction values continuously.

15. Control system for a wind turbine according to claim 11, wherein said system includes storage for at least one predefined limit value such as limit values for at least one of malfunction time, temperature, voltage, current and frequency variations.

16. Control system for a wind turbine according to claim 11, wherein said at least one detector detects malfunction values discontinuously.

17. Wind turbine connected and supplying electric energy to a utility grid, said turbine comprising:

a number of components comprising at least one of a generator, an electric control system, a transformer, gears, and controllable rotor blades;

at least one detector for detecting a malfunction in said electric utility grid;

at least one sensor for monitoring temperature of at least one of said components; and a control system for comparing said temperature with at least one predefined limit via a comparator; and at least one pitch mechanism for controlling at least one wind turbine blade in a time period of said malfunction in order to keep said temperature below said at least one predefined limit.

18. A family of wind turbines such as one or more parks of wind turbines connected and supplying electric energy to a utility grid, said family comprising:

at least two wind turbines each with at least one controllable rotor blade;

at least one detector for detecting a malfunction in said electric utility grid;

at least one sensor for monitoring temperature of at least one component of said at least two wind turbines;

a central control system for comparing said temperature with at least one predefined limit via a comparator;

at least one control mechanism for controlling said at least one wind turbine blade of said at least two wind turbines in a time period of said malfunction in order to keep said temperature below said at least one predefined limit.

* * * * *